United States Patent
Shindou

(10) Patent No.: US 8,497,132 B2
(45) Date of Patent: Jul. 30, 2013

(54) OZONE GAS CONCENTRATION MEASUREMENT METHOD, OZONE GAS CONCENTRATION MEASUREMENT SYSTEM, AND SUBSTRATE PROCESSING APPARATUS

(75) Inventor: Takehiro Shindou, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 254 days.

(21) Appl. No.: 12/612,923

(22) Filed: Nov. 5, 2009

(65) Prior Publication Data

US 2010/0119439 A1    May 13, 2010

(30) Foreign Application Priority Data

Nov. 7, 2008  (JP) ................... 2008-286687

(51) Int. Cl.
*G01N 7/00* (2006.01)
*C01B 13/10* (2006.01)
*H01L 21/4757* (2006.01)

(52) U.S. Cl.
USPC ............................ 436/135; 436/148; 423/581

(58) Field of Classification Search
None
See application file for complete search history.

(56) References Cited

U.S. PATENT DOCUMENTS 3,718,434 A * 2/1973 Pierce ........................... 436/127
5,106,589 A * 4/1992 Conrad .................... 422/186.15
5,929,324 A * 7/1999 Hu et al. ........................... 73/40
5,983,700 A * 11/1999 Yamaguchi et al. ........... 73/1.34
6,804,990 B2 * 10/2004 Weber ............................... 73/40

FOREIGN PATENT DOCUMENTS

| JP | 2002-5826 | 1/2002 |
| JP | 2004-85407 | 3/2004 |
| JP | 2004-163293 | 6/2004 |

OTHER PUBLICATIONS

Advanced Energy Industries "Fundamentals of Mass Flow Control," 2005, downloaded from the internet at URL <http://www.advanced-energy.com/upload/File/White_Papers/SL-MFCFUND-270-01.pdf>.*
Hearn, A. G. "The Absorption of Ozone in the Ultra-violet and Visible Regions of the Spectrum," Proc. Phys. Soc. 1961, 78, 932-940.*
Inn, E. C. Y. et al. "Absorption Coefficient of Ozone in the Ultraviolet and Visible Regions," J. Opt. Soc. Am. 1953, 43, 870-873.*
Guardian Manufacturing "Ozone Calculation Reference Data," downloaded from the internet at http://www.guardianmfg.com/media/Ozone_Calculation_Reference_Data_Oxygen_Flow_Gas.pdf (date unknown).*

* cited by examiner

*Primary Examiner* — Yelena G Gakh
*Assistant Examiner* — Michelle Adams
(74) *Attorney, Agent, or Firm* — Oblon, Spivak, McClelland, Maier & Neustadt, L.L.P.

(57) ABSTRACT

An ozone gas concentration measurement method that can easily measure the concentration of ozone gas. A process gas containing ozone gas is produced from a raw gas containing oxygen gas. The number of moles of gas molecules contained in the process gas is measured. The concentration of the ozone gas contained in the process gas is calculated based on the number of moles of gas molecules contained in the process gas.

5 Claims, 3 Drawing Sheets

OZONE GAS CONCENTRATION MEASUREMENT METHOD, OZONE GAS CONCENTRATION MEASUREMENT SYSTEM, AND SUBSTRATE PROCESSING APPARATUS

BACKGROUND OF THE INVENTION

1. Field of the Invention

The present invention relates to an ozone gas concentration measurement method, an ozone gas concentration measurement system, and a substrate processing apparatus, and in particular relates to an ozone gas concentration measurement method for use in producing ozone gas from oxygen gas.

2. Description of the Related Art

If a plasma processing, for example, a plasma etching processing is carried out on a wafer as a substrate using plasma produced from a carbon fluorine CF-type process gas, CF-type deposit resulting from the CF-type process gas may become attached to the wafer. The CF-type deposit attached to a surface of the wafer is removed by sputtering using plasma (positive ions), but the CF-type deposit attached to an edge (bevel portion) of the wafer cannot be removed because the bevel portion resists sputtering by plasma.

To cope with this, the CF-type deposit attached to the bevel portion of the wafer is removed using a postprocessing apparatus. Specifically, the postprocessing apparatus heats the bevel portion of the wafer by irradiation with laser light, and supplies ozone gas toward the bevel portion so that the CF-type deposit can be decomposed into CO, $CO_2$, and $F_2$ through a chemical reaction and removed. The degree of the decomposition of the CF-type deposit depends on the concentration of the supplied ozone gas, and hence in the postprocessing apparatus, the concentration of the supplied ozone gas has to be measured and adjusted.

Because ozone gas absorbs ultraviolet rays, there has conventionally been used a method in which a mixed gas containing ozone gas is irradiated with ultraviolet rays using an ultraviolet lamp, and the concentration of ozone gas is calculated and measured based on the degree to which the ultraviolet rays are absorbed (see, for example, Japanese Laid-Open Patent Publication (Kokai) No. 2004-163293).

However, the life expectancy of the ultraviolet lamp is as short as about one year, and moreover, a certain amount of time is required before the ultraviolet lamp is able to irradiate stable ultraviolet rays. Further, if the ultraviolet lamp is continuously used for a long time, the amount of luminescence gradually decreases, and hence the ultraviolet lamp has to be calibrated every one week. Thus, there is the problem that the method of measuring the concentration of the ozone gas using the ultraviolet lamp is inconvenient.

SUMMARY OF THE INVENTION

The present invention provides an ozone gas concentration measurement method, an ozone gas concentration measurement system, and a substrate processing apparatus that can easily measure the concentration of ozone gas.

Accordingly, in a first aspect of the present invention, there is provided an ozone gas concentration measurement method comprising a producing step of producing a produced gas containing ozone gas from a raw gas containing oxygen gas, a measurement step of measuring the number of moles of gas molecules contained in the produced gas, and a calculation step of calculating a concentration of the ozone gas contained in the produced gas based on the number of moles of gas molecules contained in the produced gas.

According to the first aspect of the present invention, the concentration of the ozone gas contained in the produced gas is calculated based on the number of moles of gas molecules contained in the produced gas containing the ozone gas having changed from the oxygen gas. Because the number of moles of gas molecules changes from 3 to 2 when the oxygen gas changes into the ozone gas, the number of moles of gas molecules contained in the produced gas changes from the number of moles of gas molecules contained in the raw gas. Thus, based on the amount of change in the number of moles, the amount of produced ozone gas can be calculated, and further, the concentration of the ozone gas can be calculated. Namely, it is unnecessary to use an ultraviolet lamp, and thus the concentration of the ozone gas can be easily measured.

The first aspect of the present invention can provide an ozone gas concentration measurement method, wherein in the measurement step, a flow rate of the produced gas is measured, and in the calculation step, a rate of change in flow rate from the raw gas to the produced gas is calculated.

According to the first aspect of the present invention, the concentration of the ozone gas is calculated based on the rate of change in flow rate from the raw gas to the produced gas. When the number of moles of gas molecules changes, the flow rate changes, too. Moreover, the rate of change in flow rate depends on the number of moles of the oxygen gas having changed into the ozone gas. Thus, based on the rate of change in flow rate, the number of moles of oxygen gas having changed into the ozone gas can be calculated based on the rate of change in flow rate, and by extension the number of moles of the ozone gas as well as the concentration of the ozone gas can be easily calculated.

The first aspect of the present invention can provide an ozone gas concentration measurement method, wherein prior to the producing step, a relationship between the rate of change in flow rate and the concentration of the ozone gas contained in the produced gas is calculated, and in the calculation step, the concentration of the ozone gas is calculated based on the relationship.

According to the first aspect of the present invention, because the relationship between the rate of change in flow rate and the concentration of the ozone gas contained in the produced gas is calculated in advance, and the concentration of the ozone gas is calculated based on the calculated relationship, it is unnecessary to calculate the number of moles of ozone gas molecules contained in the produced gas, and thus the concentration of the ozone gas can be more easily calculated.

Accordingly, in a second aspect of the present invention, there is provided an ozone gas concentration measurement system comprising, a producing unit adapted to produce a produced gas containing ozone gas from a raw gas containing oxygen gas, a measurement unit adapted to measure the number of moles of gas molecules contained in the produced gas, and a calculation unit adapted to calculate a concentration of the ozone gas contained in the produced gas based on the number of moles of gas molecules contained in the produced gas.

The second aspect of the present invention can provide an ozone gas concentration measurement system, wherein the measurement unit is adapted to measure a flow rate of the produced gas, and the calculation unit is adapted to calculate a rate of change in flow rate from the raw gas to the produced gas.

The second aspect of the present invention can provide an ozone gas concentration measurement system, wherein the calculation unit is adapted to calculate in advance a relationship between the rate of change in flow rate and the concentration of the ozone gas contained in the produced gas, and calculate the concentration of the ozone gas based on the relationship.

Accordingly, in a third aspect of the present invention, there is provided a substrate processing apparatus including an ozone gas concentration measurement system.

The features and advantages of the invention will become more apparent from the following detailed description taken in conjunction with the accompanying drawings.

DETAILED DESCRIPTION OF PREFERRED EMBODIMENTS

The present invention will now be described in detail with reference to the drawings showing a preferred embodiment thereof.

Figure 1:
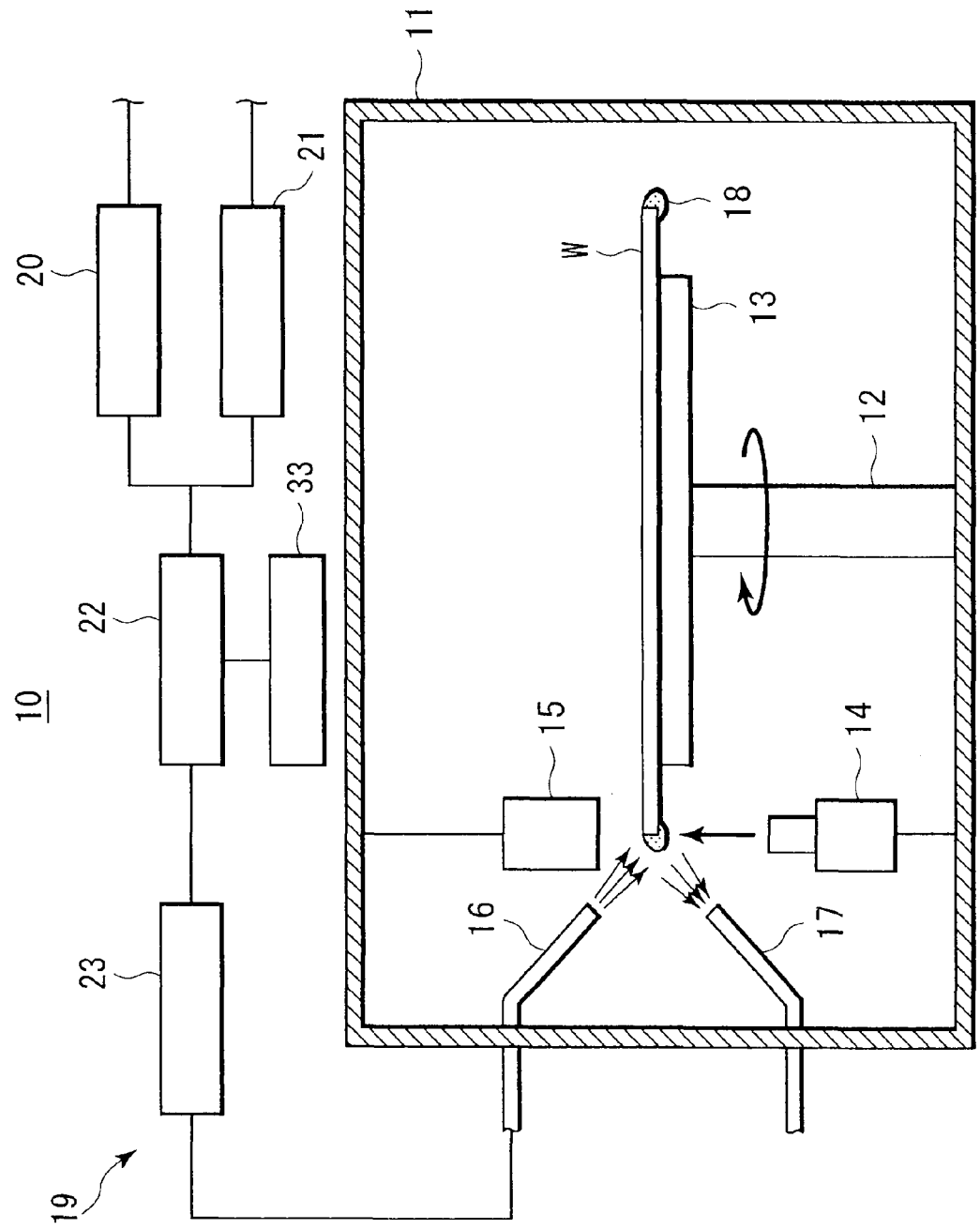
FIG. 1 is a cross-sectional view schematically showing the construction of a bevel portion cleaning apparatus as a substrate processing apparatus according to an embodiment of the present invention.

FIG. 1 is a cross-sectional view schematically showing the construction of a bevel portion cleaning apparatus as a substrate processing apparatus according to the present embodiment.

Referring to FIG. 1, the bevel portion cleaning apparatus 10 has a box-shaped chamber 11 in which a wafer W for a semiconductor device is housed, and a disk-shaped stage 13 that is disposed in the chamber 11 and supported by a shaft 12 installed in a manner standing from a bottom of the chamber 11. The wafer W is mounted on the stage 13, but an edge (hereinafter referred to as the "bevel portion") of the wafer W projects out from the stage 13 because the diameter of the stage 13 is set to be smaller than that of the wafer W, and hence not only a front surface but also a rear surface of the bevel portion is exposed to a space in the chamber 11.

The stage 13 has a mechanism that attracts the wafer W, for example, an electrostatic chuck or a vacuum chuck, and the shaft 12 rotates about the central axis to rotate the stage 13 in a horizontal plane, and hence the wafer W as well as the stage 13 rotates in a horizontal plane.

The bevel portion cleaning apparatus 10 also has a laser irradiating unit 14 that is disposed to face the rear surface of the bevel portion of the wafer W mounted on the stage 13, a power meter 15 as a laser light receiving unit that faces the laser irradiating unit 14 via the bevel portion, a gas supply nozzle 16 that jets and supplies a process gas (produced gas) containing ozone gas toward the bevel portion, and a gas suction nozzle 17 that sucks and removes gas around the bevel portion.

In the bevel portion cleaning apparatus 10, the process gas is supplied toward CF-type deposit 18 attached to the bevel portion, and also, thermal energy is given to the bevel portion by irradiation with laser light. In this instance, the CF-type deposit 18 is decomposed into CO, $CO_2$, and $F_2$ due to a chemical reaction with the ozone gas in the process gas, and the thermal energy given by the laser light promotes this chemical reaction. As a result, the CF-type deposit 18 is removed. It should be noted that major portion of CO, $CO_2$, and $F_2$ resulting from the decomposition is sucked and removed by the gas suction nozzle 17.

Here, because the wafer W rotates in a horizontal plane, the entire bevel portion of the wafer W passes the laser irradiating unit 14 and the gas supply nozzle 16, so that the CF-type deposit 18 is removed from the entire bevel portion.

Further, the bevel portion cleaning apparatus 10 has a fan filter unit (not shown) disposed above the chamber 11, and an exhausting chamber (not shown) disposed below the chamber 11. The fan filter unit produces a downward flow flowing downward in the chamber 11. The downward flow not only sucks and removes CO, $CO_2$, and $F_2$ having not been sucked by the gas suction nozzle 17, but also prevents particles produced as a result of rotation of the shaft 12 or the stage 13 and the CF-type deposit 18 unexpectedly separated from the bevel portion from rising in the chamber 11 to go above the wafer W.

The bevel portion cleaning apparatus 10 also has a process gas supply system 19 (ozone gas concentration measurement system). The process gas supply system 19 has an oxygen gas mass flow controller 20 that is connected to an oxygen gas supply unit, not shown, and measures and controls the flow rate of oxygen gas, a nitrogen gas mass flow controller 21 that is connected to a nitrogen gas supply unit, not shown, and measures and controls the flow rate of nitrogen, a process gas producing unit 22 (producing unit) that is connected to the oxygen gas mass flow controller 20 and the nitrogen gas mass flow controller 21, a process gas mass flow controller 23 (measurement unit) that is interposed between the process gas generating unit 22 and the gas supply nozzle 16 and measures and controls the flow rate of a process gas, and a controller 33 (calculation unit) that controls the operation of, mainly, the process gas generating unit 22.

The process gas generating unit 22 generates a process gas containing ozone gas through a chemical reaction expressed by the following formula (1) from a raw gas containing oxygen gas of which flow rate has been adjusted to a predetermined rate by the oxygen gas mass flow controller 20, and nitrogen gas of which flow rate has been adjusted to a very low rate by the nitrogen gas mass flow controller 21;

$$3O_2(+N_2) \rightarrow 2O_3(+N_2) \quad (1)$$

There is a limit to energy that can be given to the raw gas through electrical discharge or the like by the process gas producing unit 22, and hence all the oxygen gas in the raw gas does not change into ozone gas, and only up to 14% of the oxygen gas changes into the ozone gas. It should be noted that the process gas producing unit 22 adjusts the amount of raw gas changing into the ozone gas by adjusting the amount of energy given to the raw gas.

Figure 2:
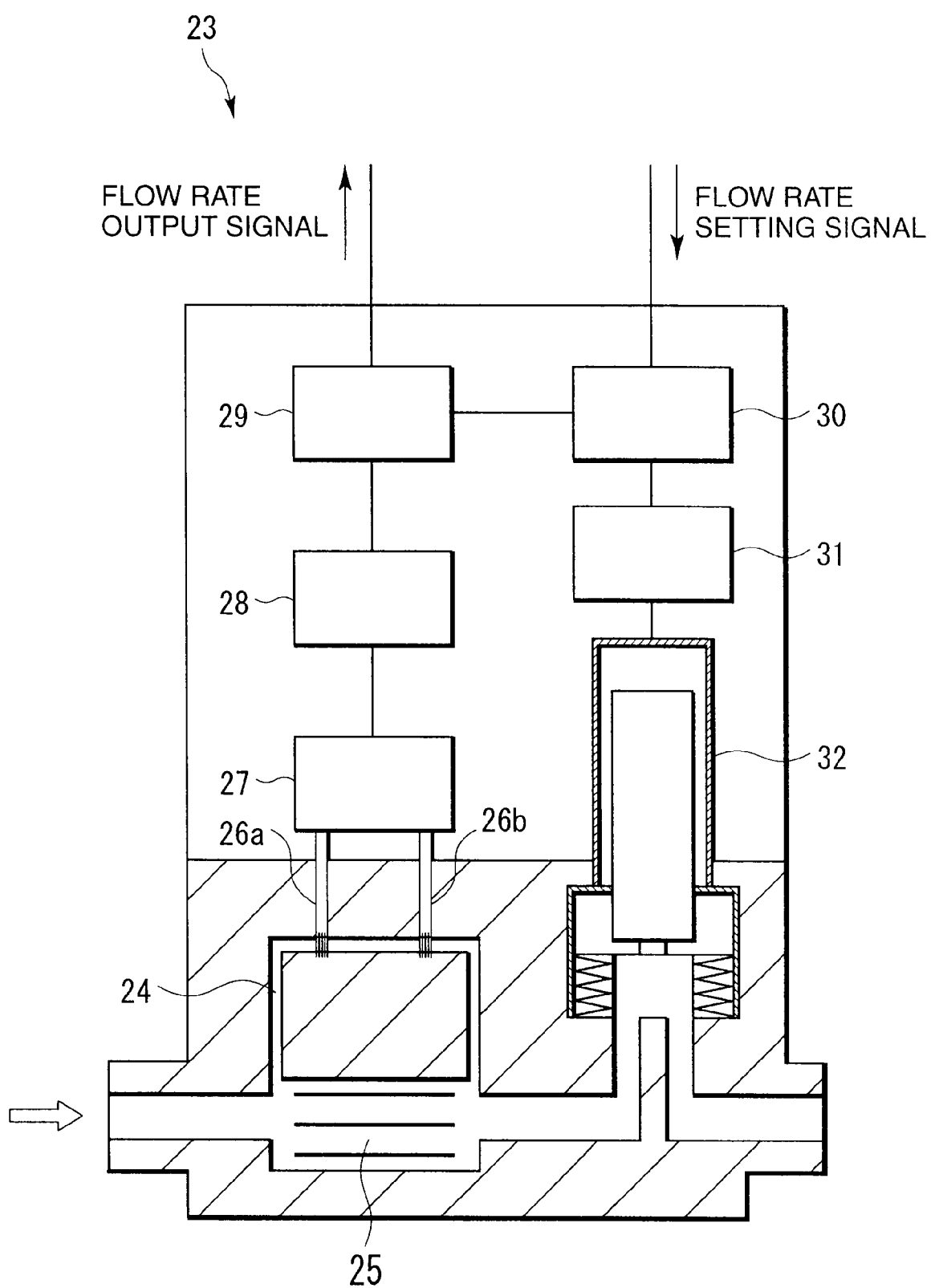
FIG. 2 is a cross-sectional view useful in briefly explaining the construction of a process gas mass flow controller appearing in FIG. 1.

FIG. 2 is a cross-sectional view useful in briefly explaining the construction of the process gas mass flow controller appearing in FIG. 1.

In the process gas mass flow controller 23 in FIG. 2, first, a process gas flowing as indicated by an arrow in the figure is distributed into a sensor flow path 24 and a bypass flow path 25. Two heating resistors 26a and 26b are disposed such as to surround the sensor flow path 24, and constitute a temperature sensor, which is connected to a bridge circuit 27. When the process gas flows in the sensor flow path 24, a temperature difference develops between the upstream heating resistor 26a and the downstream heating resistor 26b. The temperature difference varies according to the flow rate of the process gas, and in a certain range of flow rate, there is a primary proportional relationship between the temperature difference and the flow rate. The measured temperature difference is translated into an electrical signal by the bridge circuit 27, and the electrical signal is converted into a linear voltage signal of 0 volt to 5 volts via an amplification circuit 28 and a correction circuit 29 and transmitted to a comparing control circuit 30, and also transmitted as a flow rate output signal indicative of the flow rate from the process gas mass flow controller 23 to the controller 33.

The comparing control circuit 30 receives a flow rate setting signal from the controller 33, produces a difference signal by comparing the flow rate setting signal and the flow rate output signal to each other, and transmits the difference signal to a valve driving circuit 31. The valve driving circuit 31 drives a flow rate control valve 32 so that the value of the difference signal can be 0. Thus, the process gas mass flow controller 23 not only outputs the flow rate output signal, but also adjusts the flow rate to a value corresponding to the flow rate setting signal.

The process gas mass flow controller 23 is comprised of the individual electric circuits, the temperature sensor, and the flow rate control valve 32 as described above, and these component elements are resistant to deterioration and thus have long lives. Moreover, there is seldom any need for calibrating the temperature sensor because it hardly requires time for stabilizing, and its sensitivity hardly deteriorates with age. Therefore, the process gas mass flow controller 23 is much more convenient than a unit that measures the concentration of the ozone gas using an ultraviolet lamp.

In the ozone gas concentration measurement method according to the present embodiment, the concentration of the ozone gas contained in the process gas is measured by taking advantage of the fact that the number of moles changes from 3 to 2 when the oxygen gas changes into the ozone gas as expressed by the above formula (1). Specifically, when part of the ozone gas contained in the raw gas is changed into the ozone gas by the process gas generating unit 22, the total number of moles of oxygen gas molecules and ozone gas molecules contained in the process gas changes from the number of moles of oxygen gas molecules contained in the raw gas, and thus the concentration of the ozone gas contained in the process gas is calculated based on the number of moles of gas molecules contained in the raw gas and the number of moles of gas molecules contained in the process gas.

Here, if the number of moles of oxygen gas molecules and ozone gas molecules contained in the process gas included in the flow rate in a unit time (hereinafter referred to merely as the "flow rate") are known, the concentration of the ozone gas contained in the process gas can be easily calculated based on the number of moles of oxygen gas molecules and ozone gas molecules as shown in the following Table 1.

TABLE 1

| RAW GAS | PROCESS GAS | | OZONE GAS PERCENTAGE | |
|---|---|---|---|---|
| OXYGEN (mol) | OXYGEN (mol) | OZONE (mol) | (%) | (ng/m$^3$) |
| 0.029 | 0.029 | 0.000 | 0 | 0 |
| | 0.028 | 0.000 | 1 | 21 |
| | 0.028 | 0.001 | 2 | 43 |
| | 0.028 | 0.001 | 3 | 64 |
| | 0.027 | 0.001 | 4 | 86 |
| | 0.027 | 0.001 | 5 | 107 |
| | 0.026 | 0.002 | 6 | 129 |
| | 0.026 | 0.002 | 7 | 150 |
| | 0.026 | 0.002 | 8 | 171 |
| | 0.025 | 0.002 | 9 | 193 |
| | 0.025 | 0.003 | 10 | 214 |
| | 0.024 | 0.003 | 11 | 236 |

TABLE 1-continued

| RAW GAS | PROCESS GAS | | OZONE GAS PERCENTAGE | |
|---|---|---|---|---|
| OXYGEN (mol) | OXYGEN (mol) | OZONE (mol) | (%) | (ng/m$^3$) |
| | 0.024 | 0.003 | 12 | 257 |
| | 0.024 | 0.004 | 13 | 279 |
| | 0.023 | 0.004 | 14 | 300 |
| | 0.023 | 0.004 | 15 | 321 |

As shown in the example in Table 1, in the case that the number of moles (0.029 mol) of oxygen gas molecules included in the flow rate of the raw gas is known, if either of the number of moles of oxygen gas molecules included in the flow rate of the process gas or the number of moles of ozone gas molecules contained in the flow rate of the process gas is known, the number of moles of the remaining gas molecules can be calculated using the above Formula (1), and it is thus unnecessary to measure both the number of moles of oxygen gas molecules contained in the process gas and the number of moles of ozone gas molecules contained in the process gas.

Moreover, because as expressed by the above formula (1), the number of moles decreases by the amount of oxygen having changed into the ozone gas, the number of moles of gas molecules contained in the process gas is smaller than the number of moles of gas molecules contained in the raw gas, and the degree of decrease depends on the number of moles of molecules in the oxygen gas having changed into the ozone gas. Thus, even when the number of moles of oxygen gas molecules contained in the process gas and the number of moles of ozone gas molecules contained in the process gas are not individually known, the number of moles of molecules in the oxygen gas changing into the ozone gas can be back-calculated from the number of moles of oxygen gas molecules included in the flow rate of the raw gas and the total number of moles of oxygen gas molecules and ozone gas molecules contained in the process gas if the total number of moles of oxygen gas molecules and ozone gas molecules contained in the process gas can be known. As a result, the concentration of the ozone gas contained in the process gas can be easily calculated.

By the way, when the total number of moles of oxygen gas molecules and ozone gas molecules contained in the process gas changes, the flow rate of the process gas also changes. Accordingly, in the ozone gas concentration measurement method according to the present embodiment, the concentration of the ozone gas contained in the process gas is calculated based on the degree of decrease (the rate of change in flow rate) from the raw gas to the process gas.

Specifically, when the process gas generating unit 22 produces the process gas from the raw gas (producing step), the oxygen gas mass flow controller 20 measures the flow rate of the oxygen gas, the nitrogen gas mass flow controller 21 measures the flow rate of the nitrogen gas, and the process gas mass flow controller 23 measures the flow rate of the process gas (measurement step).

Next, the rate of decrease in flow rate from the measured flow rate of the oxygen gas to the flow rate obtained by subtracting the measured flow rate of the nitrogen gas from the measured flow rate of the process gas is calculated (calculation step), and the number of moles of oxygen gas having changed into the ozone gas is calculated based on the calculated rate of decrease in flow rate from the raw gas to the process gas (hereinafter referred to as the "rate of decrease in flow rate"), and the concentration of the ozone gas is calculated based on the calculated number of moles.

Here, the rate of decrease in flow rate from the raw gas to the process gas when part of the oxygen gas in the raw gas changes into the ozone gas can be uniquely found from the number of moles of the oxygen gas having changed into the ozone gas, and by extension the percentage of the oxygen gas having changed into the ozone gas in the raw gas. Moreover, if the percentage of the oxygen gas having changed into the ozone gas in the raw gas can be known, the concentration of the ozone gas contained in the process gas can be calculated. Thus, the relationship between the rate of decrease in flow rate and the concentration of the ozone gas contained in a process gas can be obtained in advance as shown in the following Table 2.

TABLE 2

| RATE OF DECREASE IN FLOW RATE (%) | OZONE GAS PERCENTAGE |
|---|---|
| 0.00 | 0 |
| 0.50 | 1 |
| 0.99 | 2 |
| 1.48 | 3 |
| 1.96 | 4 |
| 2.44 | 5 |
| 2.91 | 6 |
| 3.38 | 7 |
| 3.85 | 8 |
| 4.31 | 9 |
| 4.76 | 10 |
| 5.21 | 11 |
| 5.68 | 12 |
| 6.10 | 13 |
| 6.54 | 14 |
| 6.98 | 15 |

In the ozone gas concentration measurement method according to the present embodiment, the relationship between the decrease in flow rate and the percentage of the ozone gas contained in a process gas shown in Table 2 is obtained in advance, and when the process gas generating unit 22 produces the process gas from the raw gas, the decrease in flow rate is calculated, and then the percentage of the ozone gas is calculated using Table 2 without calculating the number of moles of oxygen gas having changed into ozone gas.

Figure 3:
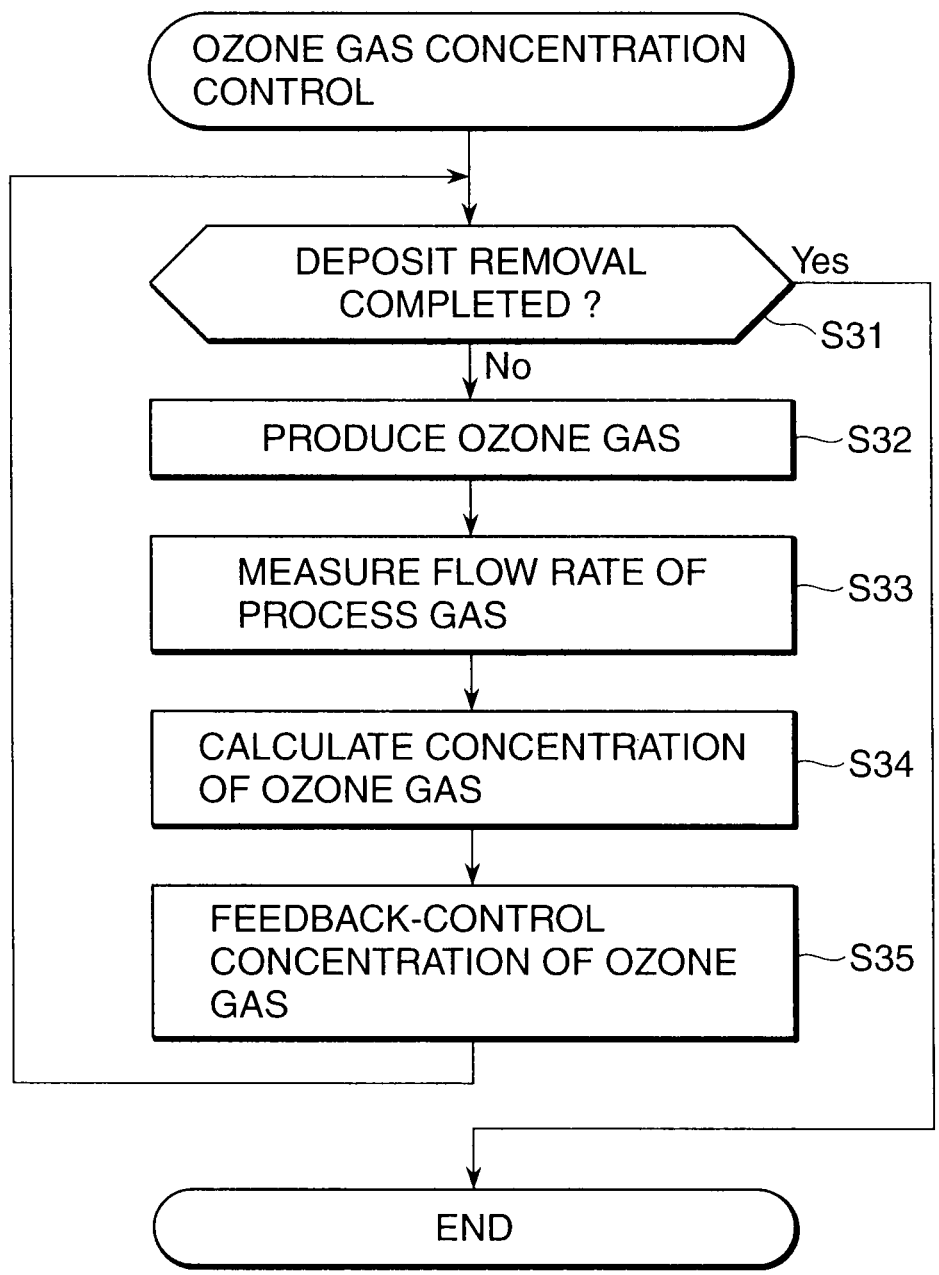
FIG. 3 is a flow chart showing an ozone gas concentration control processing to which an ozone gas concentration measurement method according to the present embodiment is applied.

FIG. 3 is a flow chart showing an ozone gas concentration control process to which the ozone gas concentration measurement method according to the present embodiment is applied. The process in FIG. 3 is executed by the controller 33 in accordance with a predetermined program.

Referring to FIG. 3, first, the controller 33 determines whether or not the removal of the CF-type deposit 18 from the entire bevel portion has been completed in the bevel portion cleaning apparatus 10 (step S31). When the removal of the CF-type deposit 18 has been completed, the present process is brought to an end. On the other hand, when the removal of the CF-type deposit 18 has not been completed, the process gas generating unit 22 produces the process gas (step S32), the oxygen gas mass flow controller 20 measures the flow rate of the oxygen gas, the nitrogen gas mass flow controller 21 measures the flow rate of the nitrogen gas, and the process gas mass flow controller 23 measures the flow rate of the process gas (step S33).

Next, the controller 33 calculates the rate of decrease from the raw gas to the process gas based on the result of the measurement in the step S33, and calculates the concentration of the ozone gas contained in the process gas based on the calculated rate of decrease and the above Table 2 (step S34).

Then, the controller 33 issues an ozone gas production amount adjusting instruction to the process gas generating unit 22 based on the calculated concentration of the ozone gas, and feedback-controls the amount of ozone gas production amount (step S35), followed by the program returning to the step S31.

According to the ozone gas concentration measurement method of the present embodiment, the concentration of the ozone gas contained in the process gas is calculated based on the rate of decrease from the raw gas to the process gas. Because the number of moles of gas molecules changes from 3 to 2 as expressed by the above formula (1) when the oxygen gas changes into the ozone gas, the number of moles of gas molecules contained in the process gas is smaller than the number of moles of gas molecules contained in the raw gas, and the degree of decrease depends on the number of moles of the oxygen gas molecules having changed into the ozone gas. As a result, once the total number of moles of oxygen gas molecules and ozone gas molecules contained in the process gas can be known, it is possible to back-calculate the number of moles of the oxygen gas having changed into the ozone gas. Moreover, the total number of moles of oxygen gas molecules and ozone gas molecules contained in the process gas corresponds to the flow rate of the process gas, and thus the number of moles of oxygen gas having changed into the ozone gas can be calculated based on the rate of decrease in flow rate, and by extension the number of moles of the ozone gas as well as the concentration of the ozone gas contained in the process gas can be easily calculated. Namely, it is unnecessary to use an ultraviolet lamp in measuring the concentration of the ozone gas, and it is only necessary to use a mass flow controller that has a long life, hardly requires time for stabilizing, and has to be calibrated very little. Thus, the concentration of the ozone gas can be easily measured.

Moreover, according to the ozone gas concentration measurement method of the present embodiment, because the concentration of the ozone gas is calculated based on the relationship between the rate of decrease in flow of rate and the concentration of the ozone gas contained in the process gas shown in Table 2, it is unnecessary to calculate the number of moles of ozone gas molecules contained in the process gas, and thus the concentration of the ozone gas can be more easily measured.

Although in the above described embodiment, the mass flow controllers (MFC) are used to measure the flow rates of the process gas and other gases, a flow control system (FCS) may be used, for example, when a front-and-back pressure difference in a flow path is large.

Moreover, although in the above described embodiment, ozone gas is used as a gas whose concentration is measured, any kind of gas may be used as a gas whose concentration is measured insofar as its number of moles of gas molecules change before and after a chemical reaction.

What is claimed is:

1. An ozone gas concentration measurement method comprising:
 a first measurement step of measuring a flow rate output of a mass flow controller for a raw gas containing oxygen;
 a producing step of producing a produced gas containing ozone gas from the raw gas containing oxygen gas;
 a second measurement step of measuring a flow rate output of a mass flow controller for the produced gas
 a calculation step of calculating a change in flow rate from the raw gas to the produced gas based on the flow rate output for the raw gas and the flow rate output for the produced gas; and a determination step of determining a percentage of the ozone gas contained in the produced gas based on the calculated change in flow rate and a relationship between changes in flow rate and ozone percentages in produced gas.

2. An ozone gas concentration measurement method as claimed in claim 1, wherein prior to said producing step, the relationship between changes in flow rate and ozone percentages in produced gas is calculated.

3. An ozone gas concentration measurement system comprising:

a raw gas flow controller adapted to measure a flow rate output of a mass flow controller for a raw gas containing oxygen;

a producing unit adapted to produce a produced gas containing ozone gas from the raw gas containing oxygen gas;

a produced gas flow controller adapted to measure a flow rate output of a mass flow controller for the produced gas; and a calculation unit programmed to (i) calculate a change in flow rate from the raw gas to the produced gas based on the flow rate output for the raw gas and the flow rate output for the produced gas, and to (ii) determine a percentage of the ozone gas contained in the produced gas based on the calculated change in flow rate and a relationship between changes in flow rate and ozone percentages in produced gas.

4. An ozone gas concentration measurement system as claimed in claim 3, wherein said calculation unit is adapted to calculate in advance the relationship between changes in flow rate and ozone percentages in produced gas.

5. A substrate processing apparatus including an ozone gas concentration measurement system as claimed in claim 3.

* * * * *